(12) United States Patent
Huang et al.

(10) Patent No.: US 12,068,542 B2
(45) Date of Patent: Aug. 20, 2024

(54) BIDIRECTIONAL CIRCULARLY POLARIZED ANTENNA ELEMENT AND BIDIRECTIONAL CIRCULARLY POLARIZED ARRAY ANTENNA

(71) Applicant: ANHUI UNIVERSITY, Hefei (CN)

(72) Inventors: Zhixiang Huang, Hefei (CN); Chao Wang, Hefei (CN); Minquan Li, Hefei (CN); Guanghui Xu, Hefei (CN); Guoda Xie, Hefei (CN); Xingang Ren, Hefei (CN); Xianliang Wu, Hefei (CN)

(73) Assignee: Anhui University, Hefei (CN)

( * ) Notice: Subject to any disclaimer, the term of this patent is extended or adjusted under 35 U.S.C. 154(b) by 106 days.

(21) Appl. No.: 17/886,255

(22) Filed: Aug. 11, 2022

(65) Prior Publication Data
US 2023/0369781 A1  Nov. 16, 2023

(51) Int. Cl.
*H01Q 21/24* (2006.01)
*H01Q 5/28* (2015.01)
*H01Q 9/04* (2006.01)

(52) U.S. Cl.
CPC .......... *H01Q 21/24* (2013.01); *H01Q 9/0492* (2013.01)

(58) Field of Classification Search
CPC ........ H01Q 21/24; H01Q 9/0492; H01Q 5/28; H01Q 9/0428; H01Q 9/045; H01Q 9/0478; H01Q 11/14; H01Q 13/0241; H01Q 15/00
See application file for complete search history.

(56) References Cited

U.S. PATENT DOCUMENTS

| 2004/0085244 | A1* | 5/2004 | Kadambi | ............... | H01Q 5/357 |
| | | | | | 343/700 MS |
| 2006/0119519 | A1* | 6/2006 | Kwon | .................... | H01Q 1/243 |
| | | | | | 343/702 |
| 2022/0368016 | A1* | 11/2022 | Lin | ........................ | H01Q 5/371 |

OTHER PUBLICATIONS

Chen et al., "Ultra-Wideband Design of Sleeve Monopole Antenna," 2007 IEEE Antennas and Propagation Society International Symposium, Dec. 6, 2002, pp. 689-692.
Kang-Ding et al. "CPW-Fed Wideband Circularly Polarized Printed Monopole Antenna With Open Loop and Asymmetric Ground Plane," IEEE Antennas And Wireless Propagation Letters, vol. 16, pp. 832-836, 2017.

* cited by examiner

*Primary Examiner* — Wei (Victor) Y Chan
(74) *Attorney, Agent, or Firm* — Miller Nash LLP

(57) ABSTRACT

Bidirectional circularly polarized antenna element and bidirectional circularly polarized array antenna are provided, and comprising a dielectric substrate, a feeder, a radiation patch, a first plane, a second plane, a first coupling assembly and a second coupling assembly which are embedded in the surface of the dielectric substrate. The first plane and the second plane of the antenna element are kept at different heights, and compared with the solution that two planes at the same height can only generate linear polarization radiation in the prior art, the circular polarization radiation can be generated, which solves the problem of linear polarization mismatch. Furthermore, two coupling assemblies are introduced into two sides of the radiation patch to enable the coupling effect with the radiation patch, such that the frequency bandwidth of the circularly polarized antenna can be greatly improved without increasing the size of the antenna.

20 Claims, 14 Drawing Sheets

BIDIRECTIONAL CIRCULARLY POLARIZED ANTENNA ELEMENT AND BIDIRECTIONAL CIRCULARLY POLARIZED ARRAY ANTENNA

REFERENCE TO RELATED APPLICATION

This patent application claims the benefit and priority of Chinese Patent Application No. 202210503972.7, filed on May 10, 2022, the disclosure of which is incorporated by reference herein in its entirety as part of the present application.

TECHNICAL FIELD

The present disclosure relates to the technical field of communications, and in particular relates to a bidirectional circularly polarized antenna element and a bidirectional circularly polarized array antenna.

BACKGROUND

With higher and higher electromagnetic wave frequency, the design and development of the antenna are continuously plagued by a plurality of problems caused by the increase of operating frequency of the antenna. Compared with a linearly polarized antenna, which can only receive the same linearly polarized wave, the circularly polarized antenna can receive any linearly polarized wave, or the circularly polarized wave, thus avoiding polarization loss caused by a polarization mismatching relationship between a transmitting antenna and a receiving antenna. The circularly polarized antenna has attracted attention of a large number of researchers due to its excellent performance in the aspects of solving polarization mismatch, restraining rain and fog interference, and eliminating Faraday effect.

However, with the rapid development of 5G wireless communication systems, more and more millimeter wave frequency bands are allocated to the wireless standards. Therefore, in order to achieve high versatility and good compatibility, the bandwidth and the volume of the antenna are increasingly demanding.

SUMMARY

An objective of the present disclosure is to provide a bidirectional circularly polarized antenna element and a bidirectional circularly polarized array antenna. The frequency bandwidth of the antenna can be improved without increasing the size of the antenna, and high universality and good compatibility of the antenna are achieved.

To achieve the objective, the present disclosure provides the following technical solutions:

A bidirectional circularly polarized antenna element comprises a dielectric substrate, and a feeder, a radiation patch, a first plane, a second plane, a first coupling assembly and a second coupling assembly which are embedded in the surface of the dielectric substrate;

the head end of the radiation patch is flush with a first horizontal edge of the dielectric substrate, the tail end of the feeder is flush with a second horizontal edge of the dielectric substrate, and the tail end of the radiation patch is connected to the head end of the feeder;

the first plane is located at a left side of the feeder, the second plane is located at a right side of the feeder, the first plane and the second plane are two planes having different heights, and the first plane and the second plane are all grounded; gaps are formed among the first plane, the feeder and the second plane;

the first coupling assembly is located at a left side of the radiation patch, the second coupling assembly is located at a right side of the radiation patch, and gaps are formed among the first coupling assembly, the radiation patch and the second coupling assembly.

Alternatively, the first coupling assembly is a C-type ring structure.

Alternatively, the second coupling assembly is a section of plane extending from the second plane.

Alternatively, the head end of the radiation patch is of a half-elliptic structure.

Alternatively, the dielectric substrate is a PCB.

Alternatively, the feeder, the radiation patch, the first plane, the second plane, the first coupling assembly and the second coupling assembly are all made of metal materials.

Corresponding to the foregoing bidirectional circularly polarized antenna element, a bidirectional circularly polarized array antenna is further provided, which comprises an array dielectric substrate, four bidirectional circularly polarized antenna elements sharing the array dielectric substrate, a rotating feed network for connecting the bidirectional circularly polarized antenna elements, a feed port, and ground planes embedded in the back surface of the array dielectric substrate;

the rotating feed network comprises a microstrip feeder, a c-type rotating feeder and four feeder stubs; the c-type rotating feeder is connected to the microstrip feeder and the four feeder stubs respectively; the four feeder stubs are respectively connected to the tail ends of the feeders of the four bidirectional circularly polarized antenna elements, every two adjacent bidirectional circularly polarized antenna elements have a phase difference of 90°; the first plane and the second plane of each bidirectional circularly polarized antenna element respectively extend to form a section of plane stub towards the c-type rotating feeder;

the ground planes comprise a feed port ground plane, a microstrip feeder ground plane, a rotating feeder ground plane and four stub ground planes respectively corresponding to the feed port, the microstrip feeder, the c-type rotating feeder and the four feeder stubs; the rotating feeder ground plane is respectively connected to the microstrip feeder and the four stub ground planes; the four stub ground planes are connected to two sections of plane stubs of the bidirectional circularly polarized antenna elements in corresponding directions by a plurality of side-by-side metal through vias; the feed port is connected to the feed port ground plane by a plurality of side-by-side metal through vias.

Alternatively, the first planes and the second planes of two adjacent bidirectional circularly polarized antenna elements are subjected to corner cut processing.

Alternatively, the microstrip feeder and the microstrip feeder ground plane are both of a layered gradually-changed structure.

Alternatively, a width of the microstrip feeder is smaller than a half wavelength corresponding to the highest frequency of the bidirectional circularly polarized array antenna.

According to the specific embodiments provided by the present disclosure, the present disclosure has the following technical effects:

A bidirectional circularly polarized antenna element provided by the present disclosure comprises a dielectric substrate, and a feeder, a radiation patch, a first plane, a second plane, a first coupling assembly and a second coupling assembly which are embedded in the surface of the dielectric substrate. The head end of the radiation patch is flush with a first horizontal edge of the dielectric substrate, the tail end of the feeder is flush with a second horizontal edge of the dielectric substrate, and the tail end of the radiation patch is connected to the head end of the feeder. The first plane is located at a left side of the feeder, the second plane is located at a right side of the feeder, the first plane and the second plane are two planes having different heights, and gaps are formed among the first plane, the feeder and the second plane. The first coupling assembly is located at a left side of the radiation patch, the second coupling assembly is located at a right side of the radiation patch, and gaps are formed among the first coupling assembly, the radiation patch and the second coupling assembly. The first plane and the second plane of the antenna element are kept at different heights, and compared with the solution that two planes at the same height can only generate linearly polarized radiation in the prior art, the circular polarization radiation can be generated, which solves the problem of linear polarization mismatch. Furthermore, two coupling assemblies are introduced into two sides of the radiation patch to enable coupling effect with the radiation patch, such that the frequency bandwidth of the circularly polarized antenna is greatly improved without increasing the size of the antenna. In another aspect, four bidirectional circularly polarized antenna elements consist of a bidirectional circularly polarized array antenna. Every two adjacent bidirectional circularly polarized antenna elements can also achieve circular polarization radiation, the circular polarization radiation generated by a feed network and the circular polarization radiation generated by the antenna element itself can be combined by a rotating feed network, thereby broadening the circular polarization bandwidth of the antenna, with the 3 dB axial ratio bandwidth up to 103.5%.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
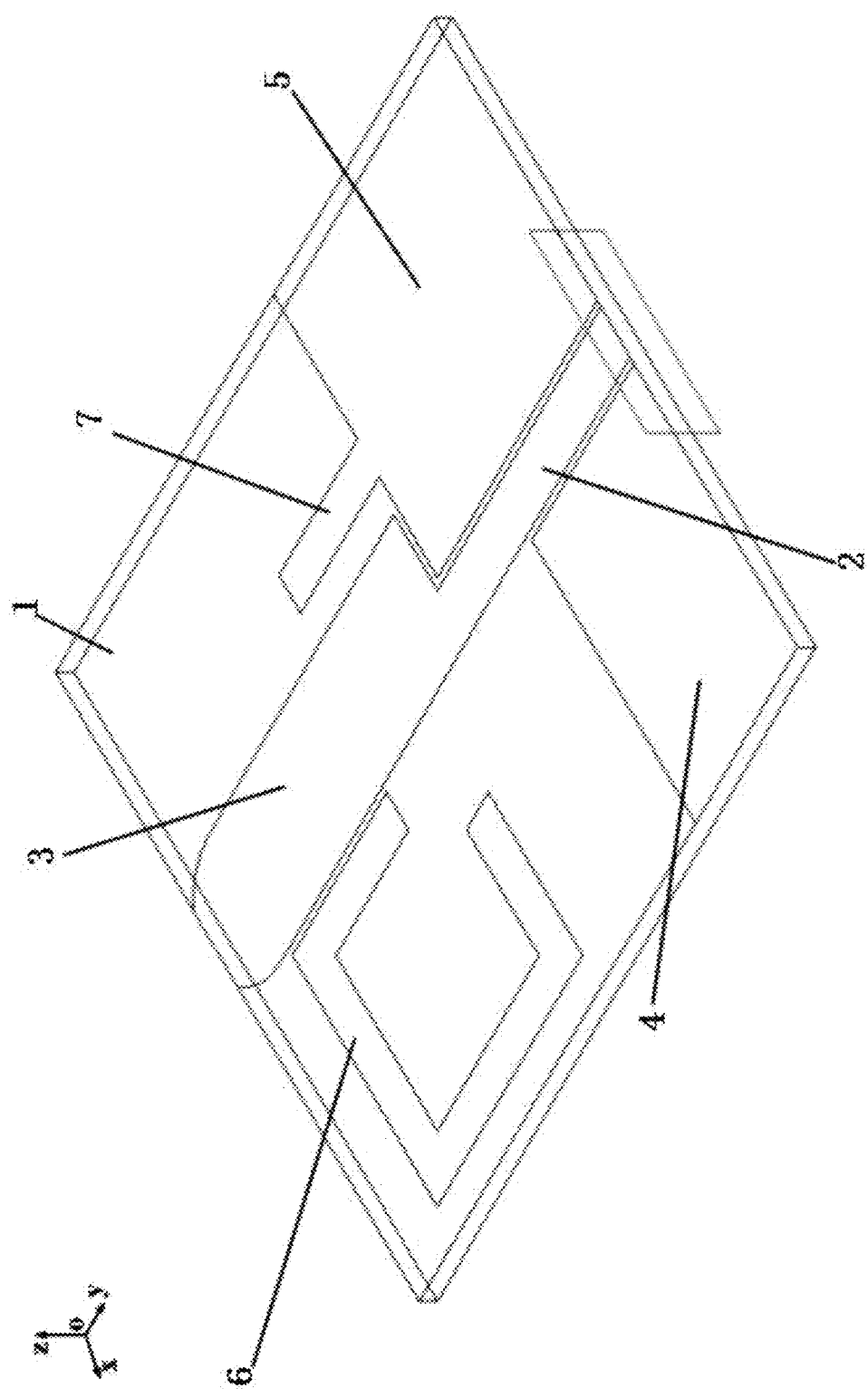
FIG. 1 is a schematic diagram of a bidirectional circularly polarized antenna element in accordance with an embodiment 1 of the present disclosure.

In the drawings: 1—dielectric substrate; 2—feeder; 3—radiation patch; 4—first plane; 5—second plane; 6—first coupling assembly; 7—second coupling assembly; 8—array dielectric substrate; 9—bidirectional circularly polarized antenna element; 10—feed port; 11—metal through via; 12—microstrip feeder; 13—c-type rotating feeder; 14—feeder stub; 15—feed port ground plane; 16—microstrip feeder ground plane; 17—rotating feeder ground plane; 18—stub ground plane; 19—plane stub.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a bidirectional circularly polarized antenna element and a bidirectional circularly polarized array antenna. The frequency bandwidth of the antenna can be improved without increasing the size of the antenna, and high universality and good compatibility of the antenna are achieved.

To make the objectives, features and advantages of the present disclosure more apparent and understandable, the following further describes the present disclosure in detail with reference to the accompanying drawings and specific embodiments.

Embodiment 1

This embodiment provides a bidirectional circularly polarized antenna element. As shown in FIG. 1, the bidirectional circularly polarized antenna element comprises a dielectric substrate 1, and a feeder 2, a radiation patch 3, a first plane 4, a second plane 5, a first coupling assembly 6 and a second coupling assembly 7 which are embedded in the surface of the dielectric substrate 1.

The head end of the radiation patch 3 is flush with a first horizontal edge of the dielectric substrate 1, the tail end of the feeder 2 is flush with a second horizontal edge of the dielectric substrate 1, and the tail end of the radiation patch 3 is connected to the head end of the feeder 2.

The first plane 4 is located at a left side of the feeder 2, the second plane 5 is located at a right side of the feeder 2, the first plane 4 and the second plane 5 are two planes having different heights, and the first plane 4 and the second plane 5 are all grounded; and gaps are formed among the first plane 4, the feeder 2 and the second plane 5.

The first coupling assembly 6 is located at a left side of the radiation patch 3, the second coupling assembly 7 is located at a right side of the radiation patch 3, and gaps are formed among the first coupling assembly 6, the radiation patch 3 and the second coupling assembly 7.

In this embodiment, the first coupling assembly 6 is of a C-type ring structure. A new resonance point is generated at a low frequency by the coupling effect between the C-type ring and the radiation patch 3.

In this embodiment, the second coupling assembly 7 is a section of plane extending from the second plane 5. A new resonance point is generated at a high frequency by the coupling effect between the second coupling assembly 7 and the radiation patch 3.

In this embodiment, the head end of the radiation patch 3 is of a half-elliptic structure, which may reduce the reflection of a current, thereby improving an impedance bandwidth and an axial ratio bandwidth of the antenna.

In this embodiment, the dielectric substrate 1 is a PCB, which may employ Rogers 5880 having a thickness of 0.127 mm and a dielectric constant of 2.2.

In this embodiment, the feeder 2, the radiation patch 3, the first plane 4, the second plane 5, the first coupling assembly 6 and the second coupling assembly 7 are all made of metal materials, which comprise but are not limited to copper clad, aluminum, gold, silver, and other metal.

Figure 2:
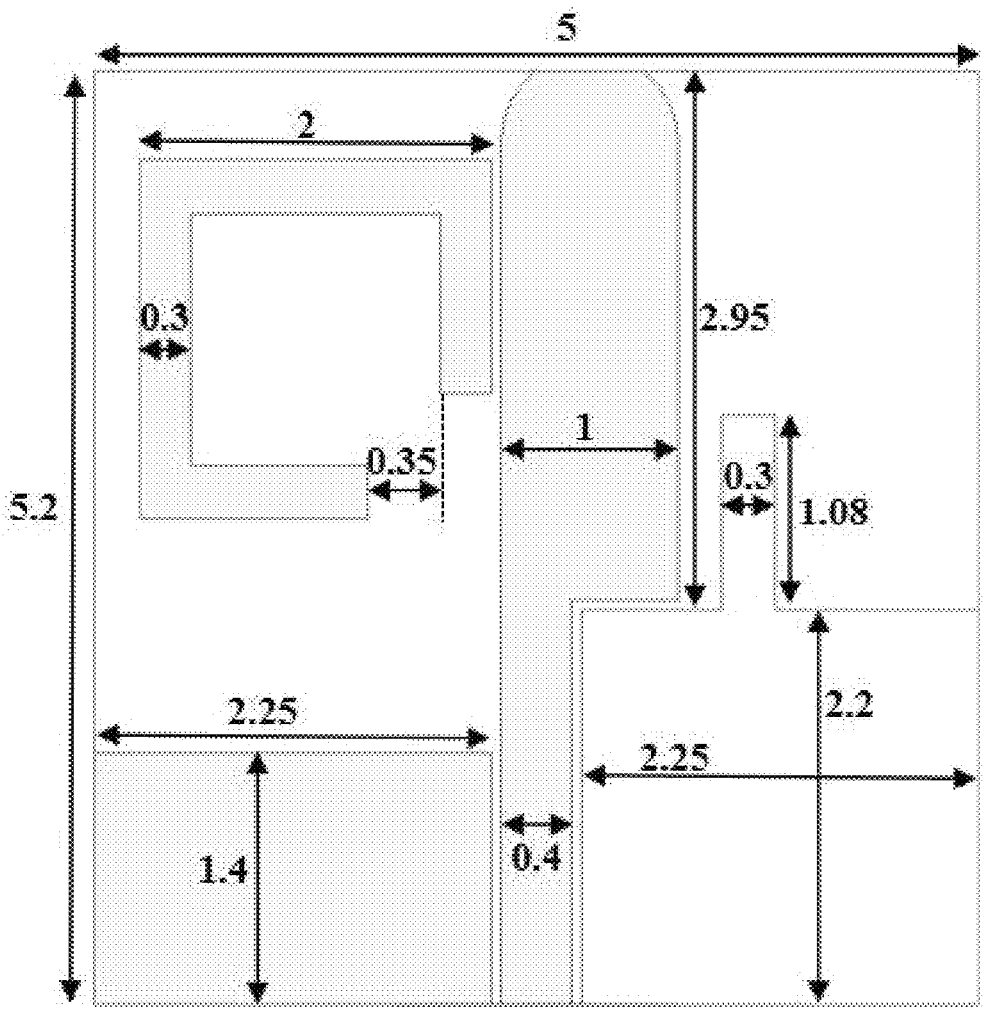
FIG. 2 is a top view of a bidirectional circularly polarized antenna element in accordance with an embodiment 1 of the present disclosure.

By introducing a C-type ring beside the radiation patch 3, a new resonance point is generated at a low frequency (23 Ghz) by using the coupling effect between the C-type ring and the radiation patch 3, thereby broadening the axial ratio bandwidth of the antenna. Furthermore, a coupling stub is further introduced to a position, close to the radiation patch 3, of the second plane 5, and a new resonance point is generated at a high frequency by the coupling effect between the coupling stub and the radiation patch 3, and thus the axial ratio bandwidth of the antenna can be further broadened. By adjusting the gap between the first plane 4 and the second plane 5, the height of the first plane 4 and the second plane 5, and the positions of the C-type ring and the coupling stub, three adjacent circularly polarized resonance points can be combined to obtain a bandwidth of the broad band. As shown in FIG. 2, after optimization, the gap between the C-type ring and the radiation patch 3 is 0.05 mm, and the distance between the coupling stub and the radiation patch 3 is 0.25 mm.

Figure 3:
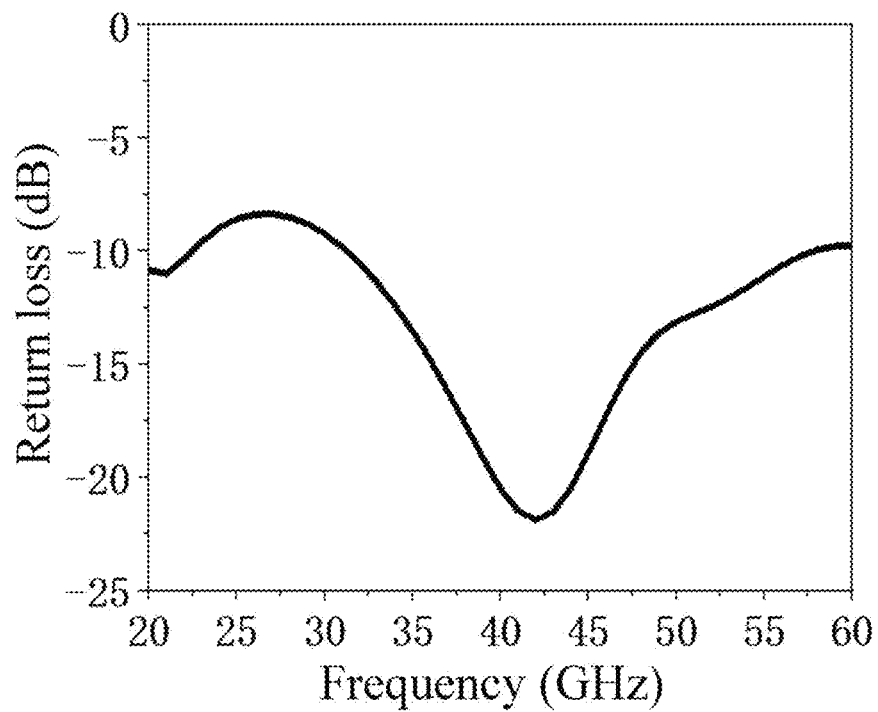
FIG. 3 is a simulation result diagram of return loss of an antenna element of an embodiment 1 of the present disclosure.
Figure 4:
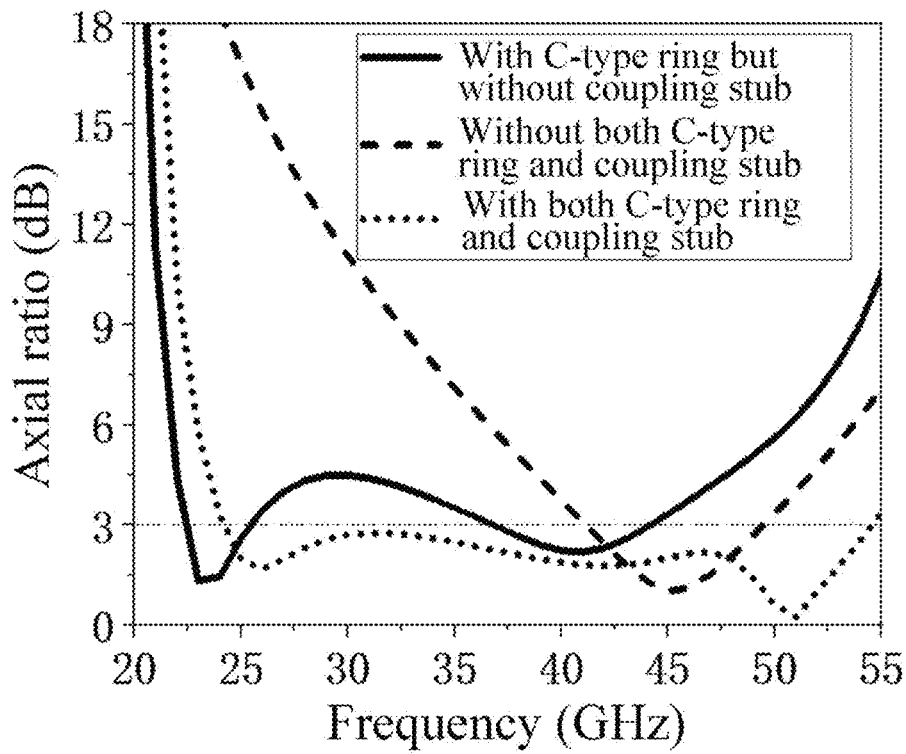
FIG. 4 is a simulation result comparison diagram of axial ratio bandwidths of an embodiment 1 of the present disclosure.

FIG. 3 shows simulation results of return loss of a bidirectional circularly polarized antenna element. The results show that the frequency bandwidth of the return loss at the −10 dB is 20 to 23.76 GHz and 29.71 to 60 GHz, and the maximum value of the return loss in the middle frequency bandwidth of 23.76 to 29.71 GHz is −8.4 dB. FIG. 4 shows a comparison diagram of axial ratio bandwidths of an element monopole antenna under different structures. In the comparison diagram, 3 dB axial ratio bandwidths of the antenna in the presence or absence of the C-type ring and the coupling stub are compared respectively, and the results show that when the C-type ring and the coupling assembly are absent, the first plane 4 and the second plane 5 may only generate one resonance point at 45 GHz, with a very narrow axial ratio bandwidth. When the C-type ring exists, because the C-type ring is coupled with the antenna, a new resonance point is generated at the low frequency, which broadens the axial ratio bandwidth. When both the C-type ring and the coupling stub exist, the antenna generates a new resonance point at a high frequency due to the adding of the coupling stub, which further broadens the axial ratio bandwidth of the antenna, and makes the 3 dB axial ratio bandwidth up to the 24.22 to 54.55 GHz and a relative bandwidth of 77%.

Embodiment 2

Figure 5:
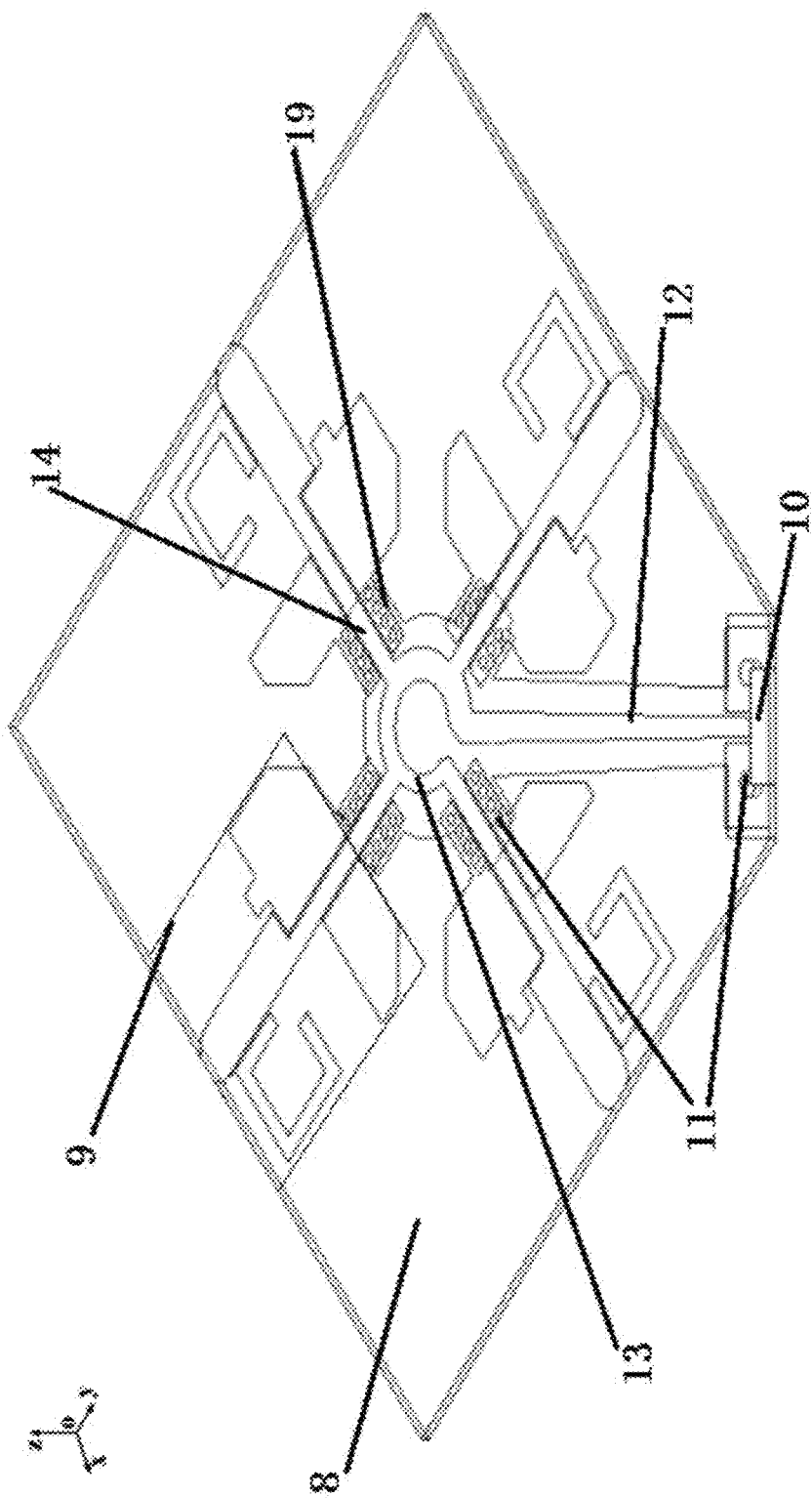
FIG. 5 is a schematic diagram of a bidirectional circularly polarized array antenna in accordance with an embodiment 2 of the present disclosure.
Figure 6:
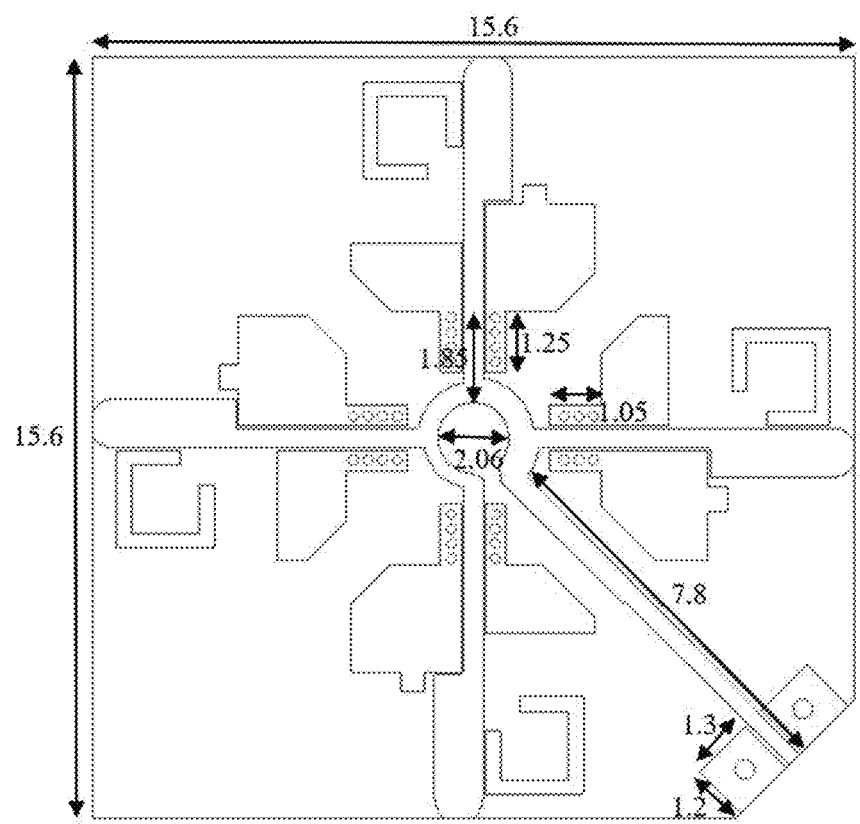
FIG. 6 is a top view of a bidirectional circularly polarized array antenna in accordance with an embodiment 2 of the present disclosure.
Figure 7:
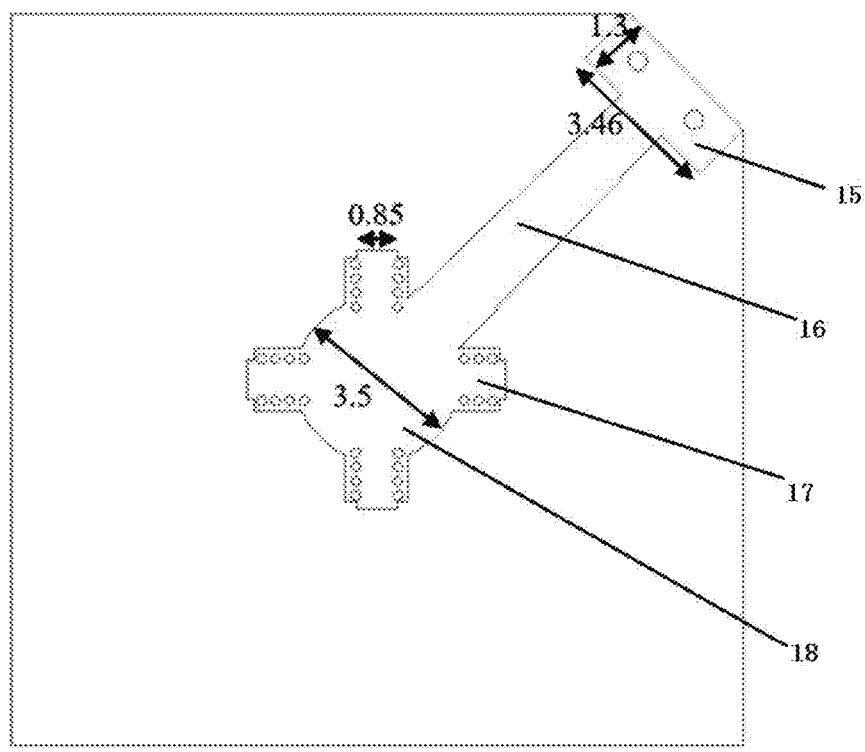
FIG. 7 is a bottom view of a bidirectional circularly polarized array antenna in accordance with an embodiment 2 of the present disclosure.

As shown in FIG. 5 to FIG. 7, corresponding to a bidirectional circularly polarized antenna element provided by the embodiment 1, this embodiment provides a bidirectional circularly polarized array antenna, which adopts coplanar waveguide feed, and employs Rogers 5880 dielectric substrate having a dielectric constant of 2.2 mm and a thickness of 0.127 mm. The bidirectional circularly polarized array antenna comprises:

an array dielectric substrate 8, four bidirectional circularly polarized antenna elements 9 of the embodiment 1 sharing the array dielectric substrate 4, a rotating feed network for connecting the bidirectional circularly polarized antenna elements 9, a feed port 10, and ground planes embedded in the back surface of the array dielectric substrate; the ground plane is connected to the first plane 4 and the second plane 5 of each bidirectional circularly polarized element array 9 by metal through vias 11 for grounding.

The rotating feed network comprises a microstrip feeder 12, a c-type rotating feeder 13, and four feeder stubs 14. The c-type rotating feeder 13 is connected to the microstrip feeder 12 and the four feeder stubs 14 respectively. The four feeder stubs 14 are respectively connected to the tail ends of the feeders 2 of the four bidirectional circularly polarized antenna elements 9, and every two adjacent bidirectional circularly polarized antenna elements have a phase difference of 90°. The first plane 4 and the second plane 5 of each bidirectional circularly polarized antenna element 9 respectively extend to form a section of plane stub 19 towards the c-type rotating feeder 13.

The ground planes comprise a feed port ground plane 15, a microstrip feeder ground plane 16, a rotating feeder ground plane 17 and four stub ground planes 18 respectively corresponding to the feed port 10, the microstrip feeder 12, the c-type rotating feeder 13 and the four feeder subs 14. The rotating feeder ground plane 17 is respectively connected to the microstrip feeder 12 and the four stub ground planes 18. The four stub ground planes 18 are connected to two sections of plane stubs 19 of the bidirectional circularly polarized antenna elements 9 in corresponding directions by a plurality of side-by-side metal through vias 11. The feed port 10 is connected to the feed port ground plane 15 by a plurality of side-by-side metal through vias 11. The metal through vias 11 play a role in connecting the ground plane below to achieve the grounding of the bidirectional circularly polarized antenna elements 9; and the side-by-side metal through vias 11 may also enable electromagnetic wave to be intensively propagated to the bidirectional circularly polarized antenna element 9 along metal through vias 11, and loss and interference caused by the propagation of electromagnetic waves to two sides are avoided.

The rotating feed network adopted by the present disclosure can further broaden the circular polarization bandwidth of the antenna. Specifically, the phases of the microstrip line-fed rotating feed network at the four feeder stubs 14 in an anticlockwise direction are respectively 0°, 90°, 180° and 270°, and every two adjacent feeder stubs 14 have a phase difference of 90° and orthogonal current directions, thereby generating a circular polarization radiation pattern. By adjusting the size of the rotating feed network and the length of the feeder stub 14, the circular polarization radiation generated by the rotating feed network and the circular polarization radiation generated by the bidirectional circular polarization antenna element 9 itself can be combined to broaden the circular polarization bandwidth of the array antenna, with a 3 dB axial ratio bandwidth up to 103.5%. If the axial ratio of less than 3 dB, the radiation is considered as the circular polarization radiation, and otherwise, it is not the circular polarization radiation.

In this embodiment, the first planes 4 and the second planes 5 of the two adjacent bidirectional circularly polarized antenna elements 9 are subjected to corner cut processing, such that the bidirectional circularly polarized antenna elements 9 are closer to each other to improve the directionality and gain of the array antenna and reduce sidelobe level. If no corner cut processing, the ground planes between the elements may be in contact with each other to lead to deterioration of the performance.

In this embodiment, the microstrip feeder 12 and the microstrip feeder ground plane 16 are both of a layered gradually-changed structure. For example, the microstrip feeder 12 employs a 10-level gradually-changed structure, the ten levels of gradual change refer to that the structure is formed by connecting ten sections of rectangular structures having the same length but different widths, adjacent edge vertexes of all adjacent rectangles are connected to form the gradually-changed structure, and if the adjacent edge vertexes are not connected, a stepped structure is formed. In the ten levels of gradual change, the gradual change amplitude from the first level to the second level is 0.01 mm, and the width of each of the rest levels is sequentially and uniformly increased by an amplitude of 0.02 mm. The rectangle connected to the feed port 10 is the first level, which is the narrowest and has a width of 0.3 mm, and the rectangle connected to the rotating feed network is the tenth level, which is the widest and has a width of 0.47 mm. As the microstrip feeder 12 of the gradually-changed structure has a gradually-changed feeder width, the impedance change between resonant modes at different frequencies is relatively small, resonance can be performed at different positions of the microstrip feeder 12 under different frequencies, facilitating to the achieving of the broadband characteristic. The microstrip feeder ground plane 16 employs a gradually-changed structure like the microstrip feeder 12, having a total of 10 levels of gradual change. The width of each level is sequentially and uniformly increased by an amplitude of 0.04 mm, the rectangle close to the feed port 10 is the narrowest, with a width of 1.14 mm, and the rectangle close to the rotating feed network is the widest, with a width of 1.50 mm.

In this embodiment, the width of the microstrip feeder 12 is smaller than a half wavelength corresponding to the highest frequency of the bidirectional circularly polarized antenna, which is conducive to reducing undesired feeder radiation, thereby reducing the loss of the rotating feed network, and achieving a higher gain.

Figure 8:
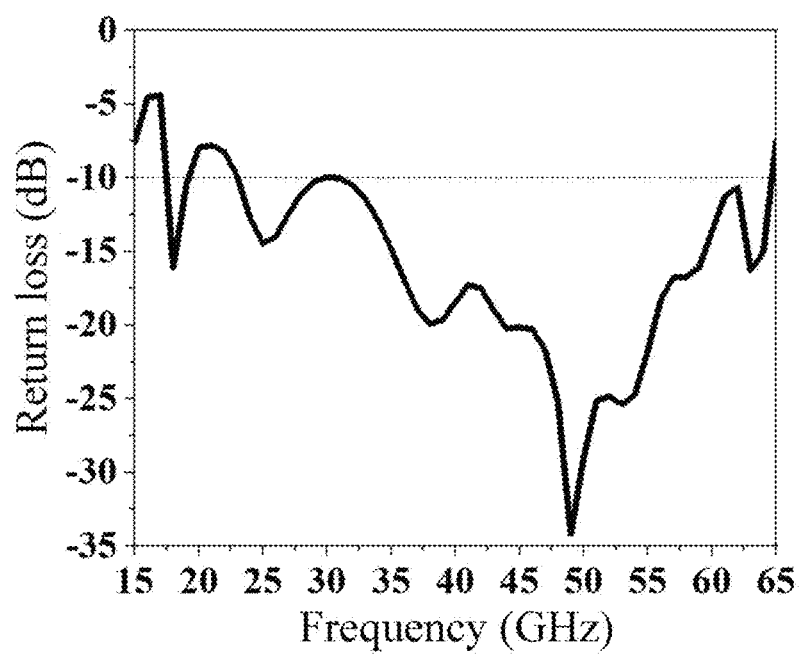
FIG. 8 is a simulation result diagram of return loss of an array antenna in accordance with an embodiment 2 of the present disclosure.
Figure 9:
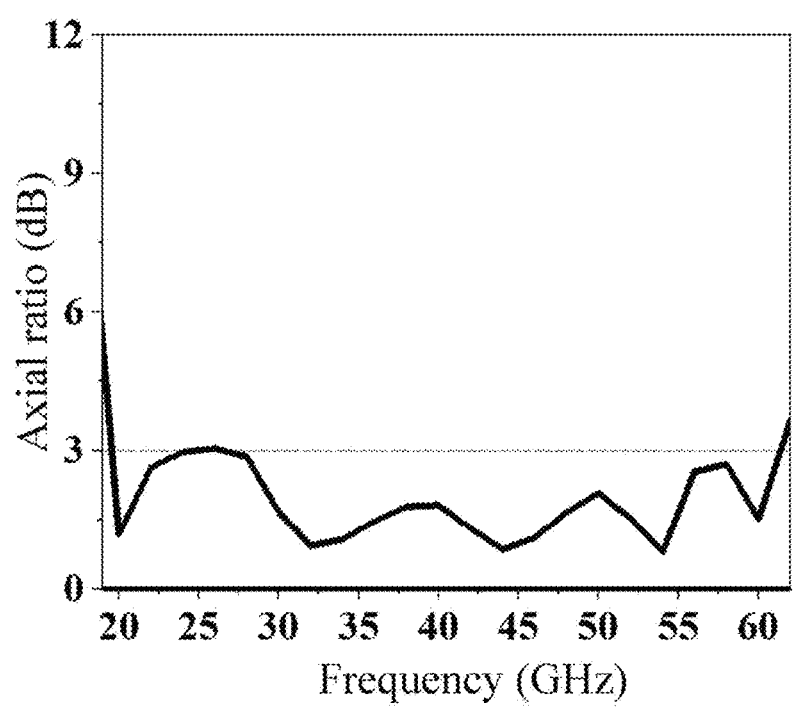
FIG. 9 is a simulation result comparison diagram of axial ratios of an array antenna in accordance with an embodiment 2 of the present disclosure.
Figure 10:
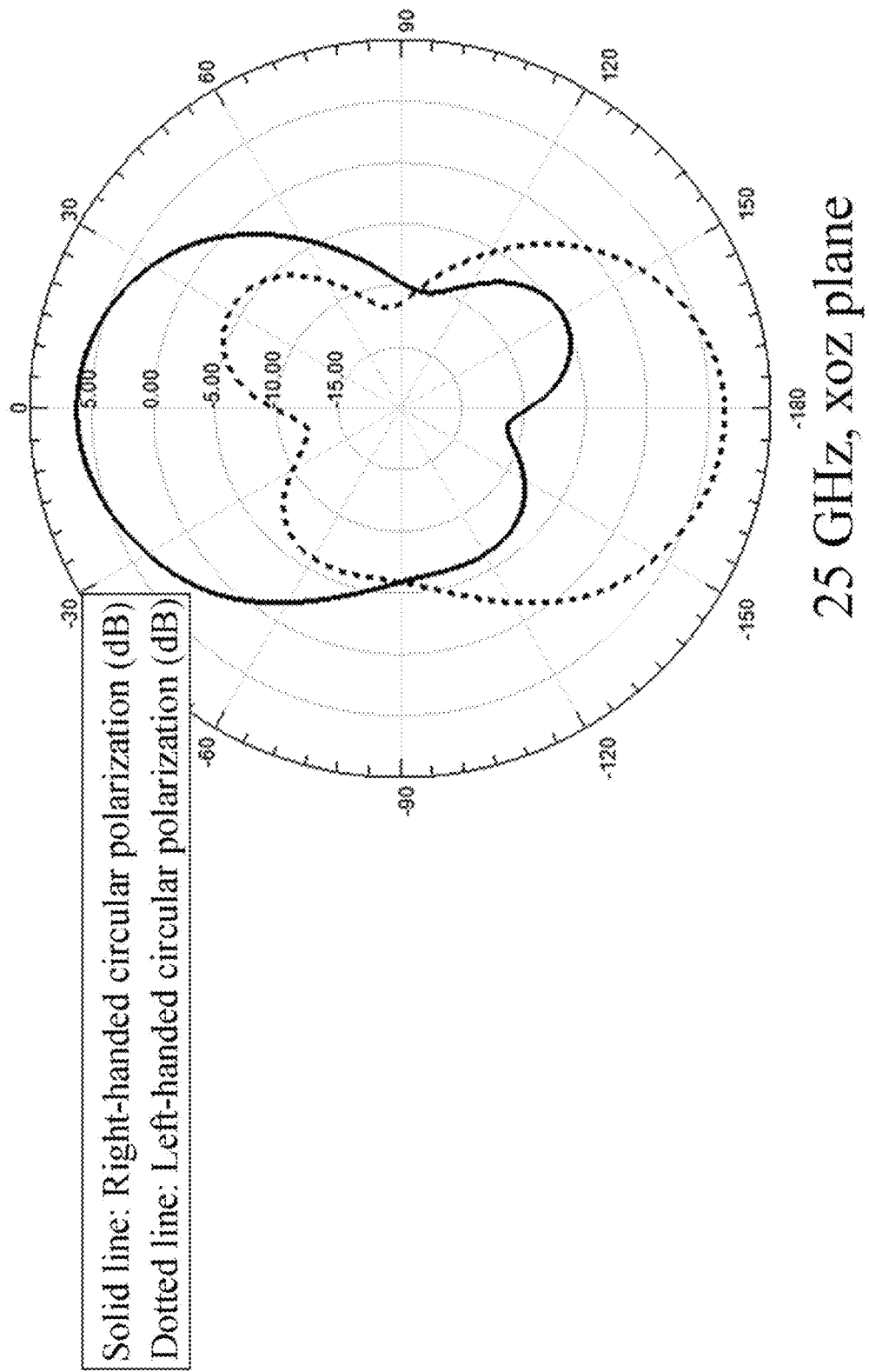
FIG. 10 is a circular polarization pattern of an array antenna of an embodiment 2 of the present disclosure in an xoz plane at a frequency point of 25 GHz.
Figure 11:
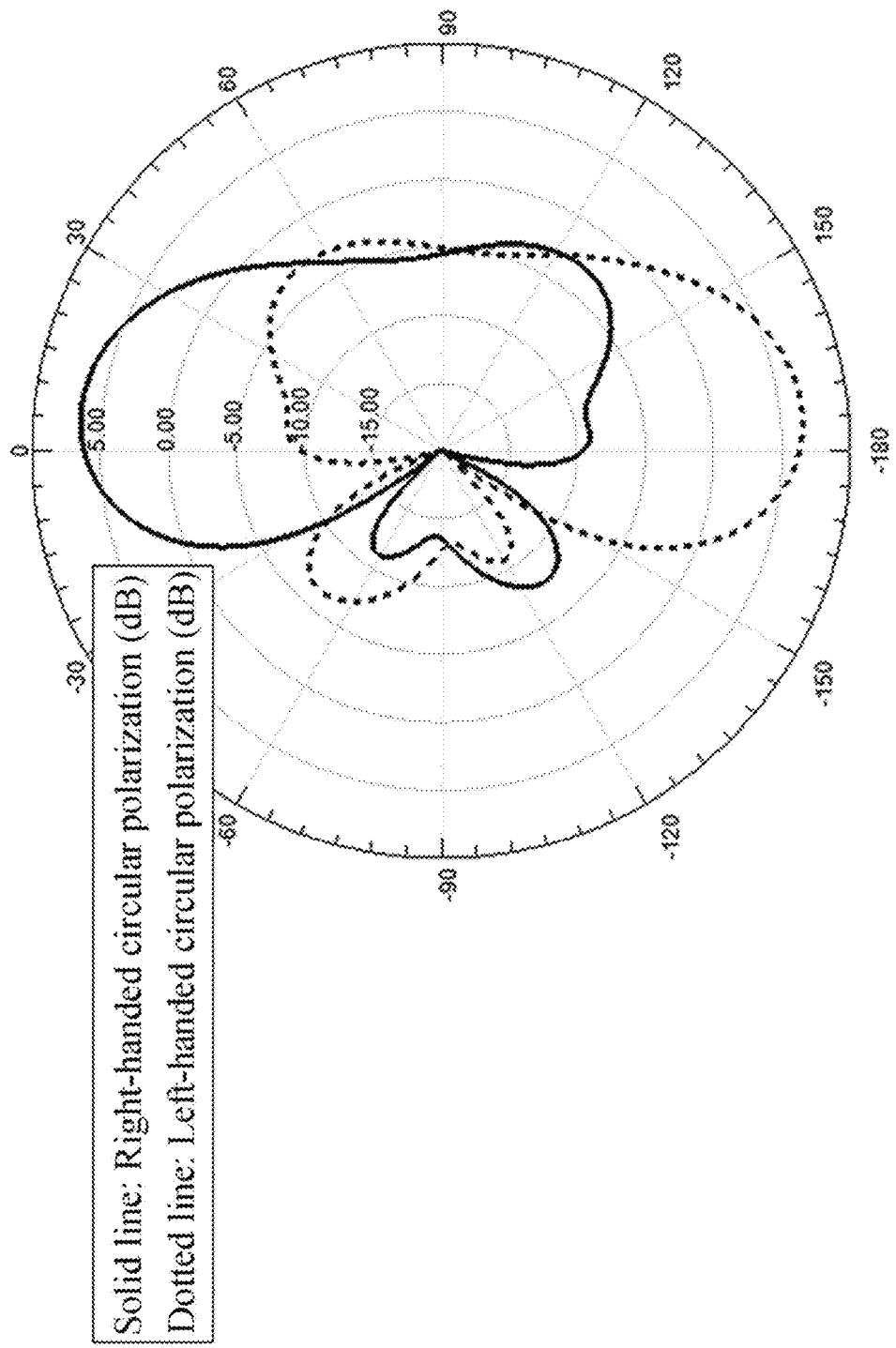
FIG. 11 is a circular polarization pattern of an array antenna of an embodiment 2 of the present disclosure in a yoz plane at a frequency point of 25 GHz.
Figure 12:
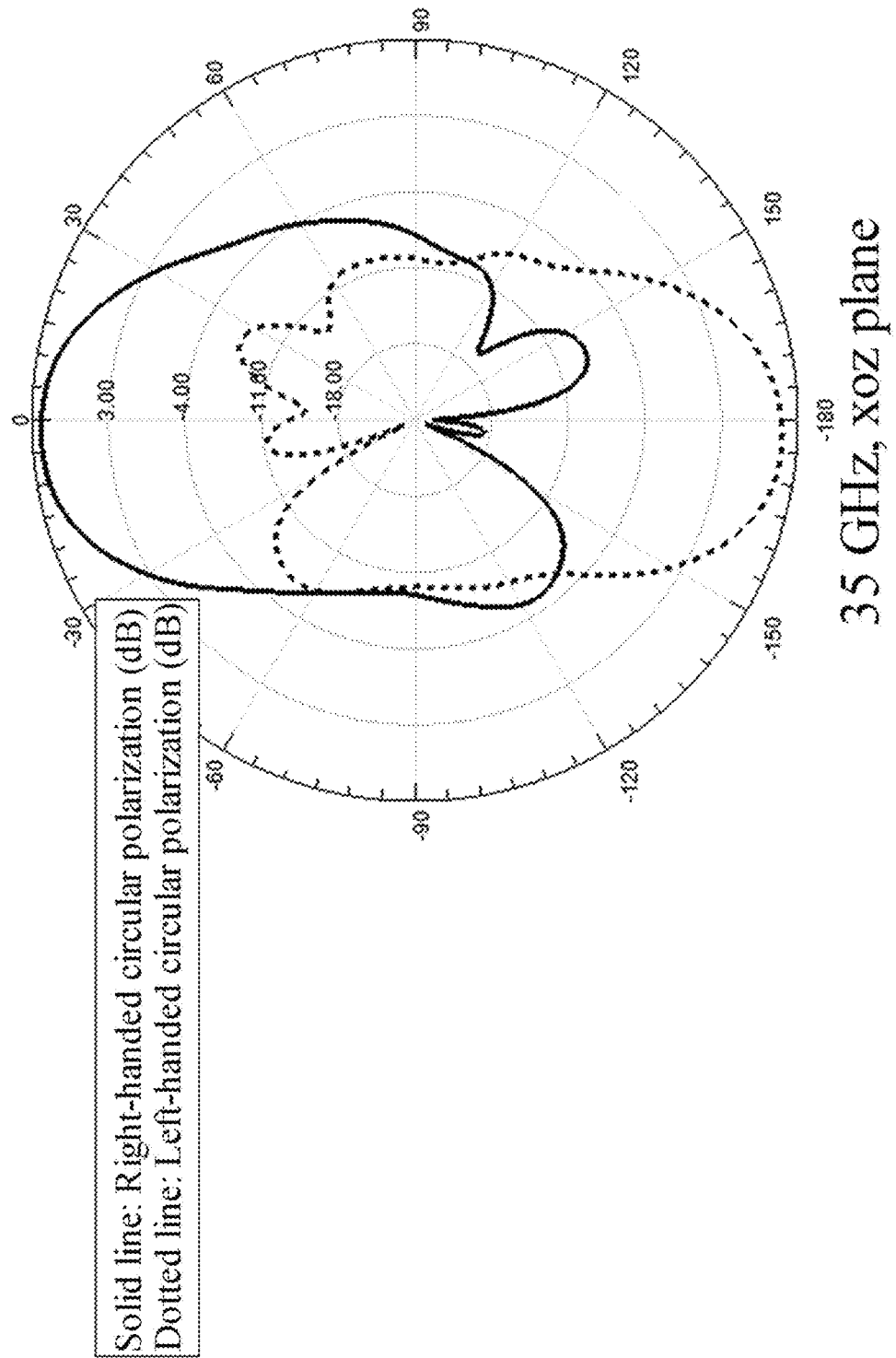
FIG. 12 is a circular polarization pattern of an array antenna of an embodiment 2 of the present disclosure in an xoz plane at a frequency point of 35 GHz.
Figure 13:
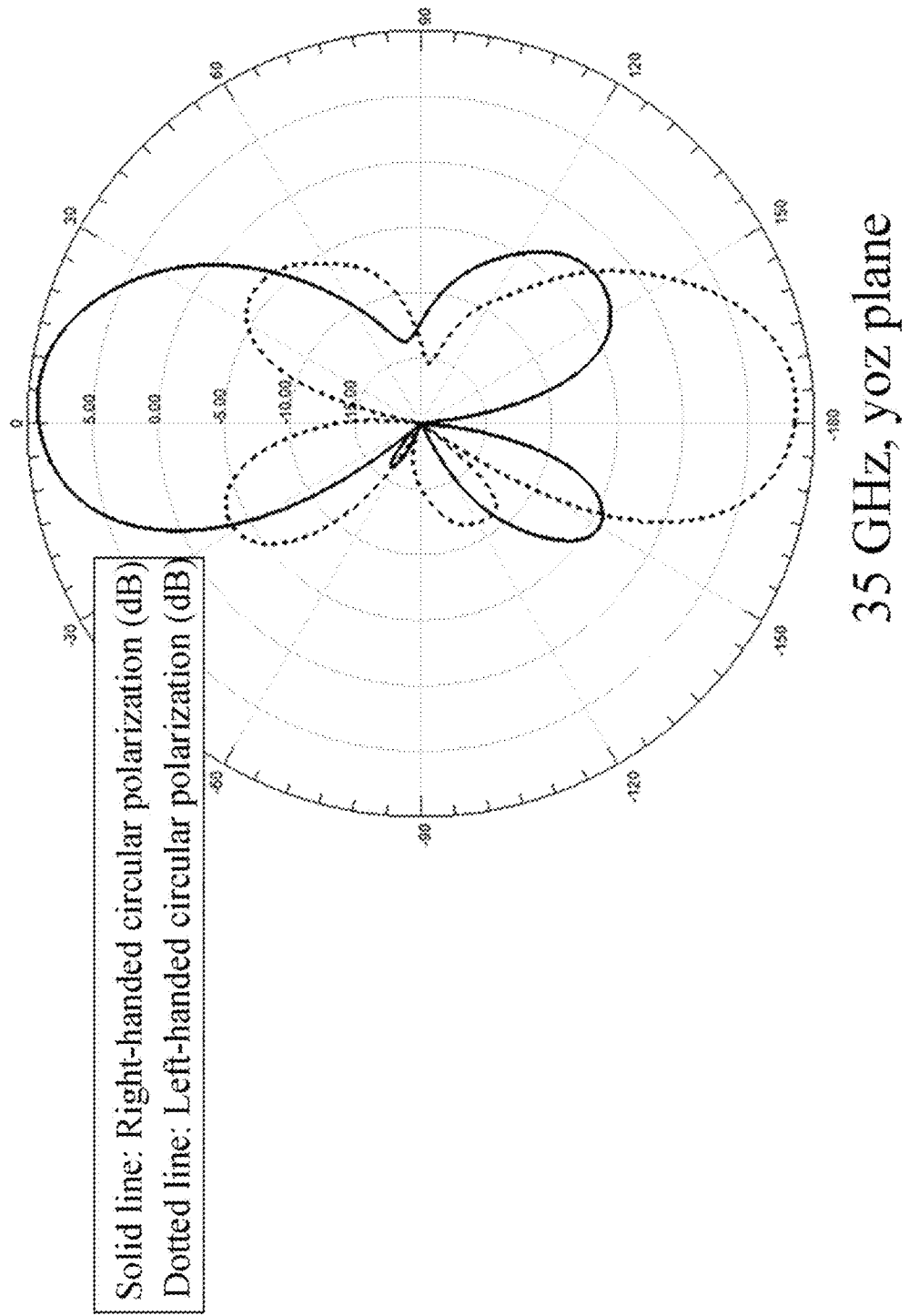
FIG. 13 is a circular polarization pattern of an array antenna of an embodiment 2 of the present disclosure in a yoz plane at a frequency point of 35 GHz.
Figure 14:
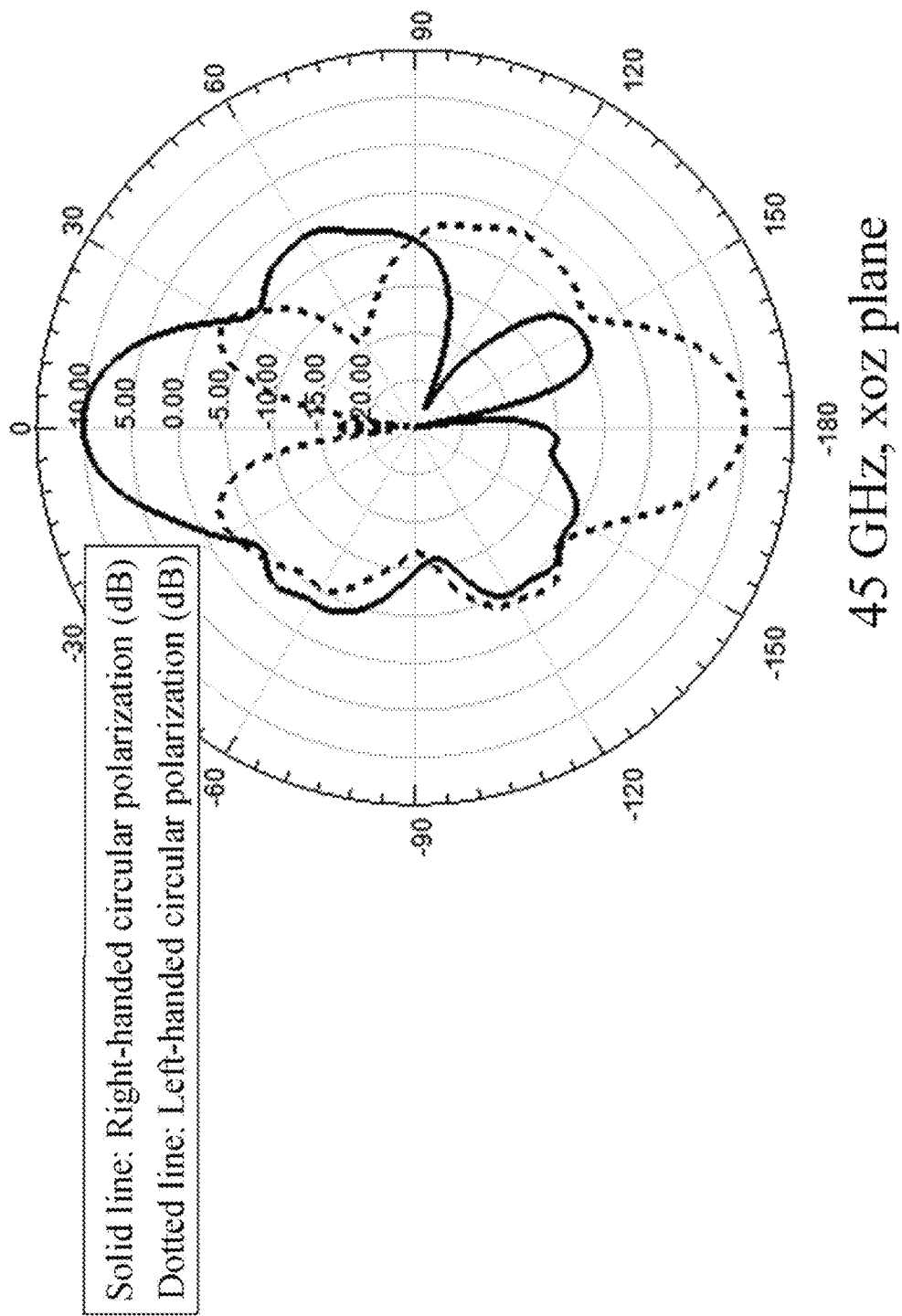
FIG. 14 is a circular polarization pattern of an array antenna of an embodiment 2 of the present disclosure in an xoz plane at a frequency point of 45 GHz.
Figure 15:
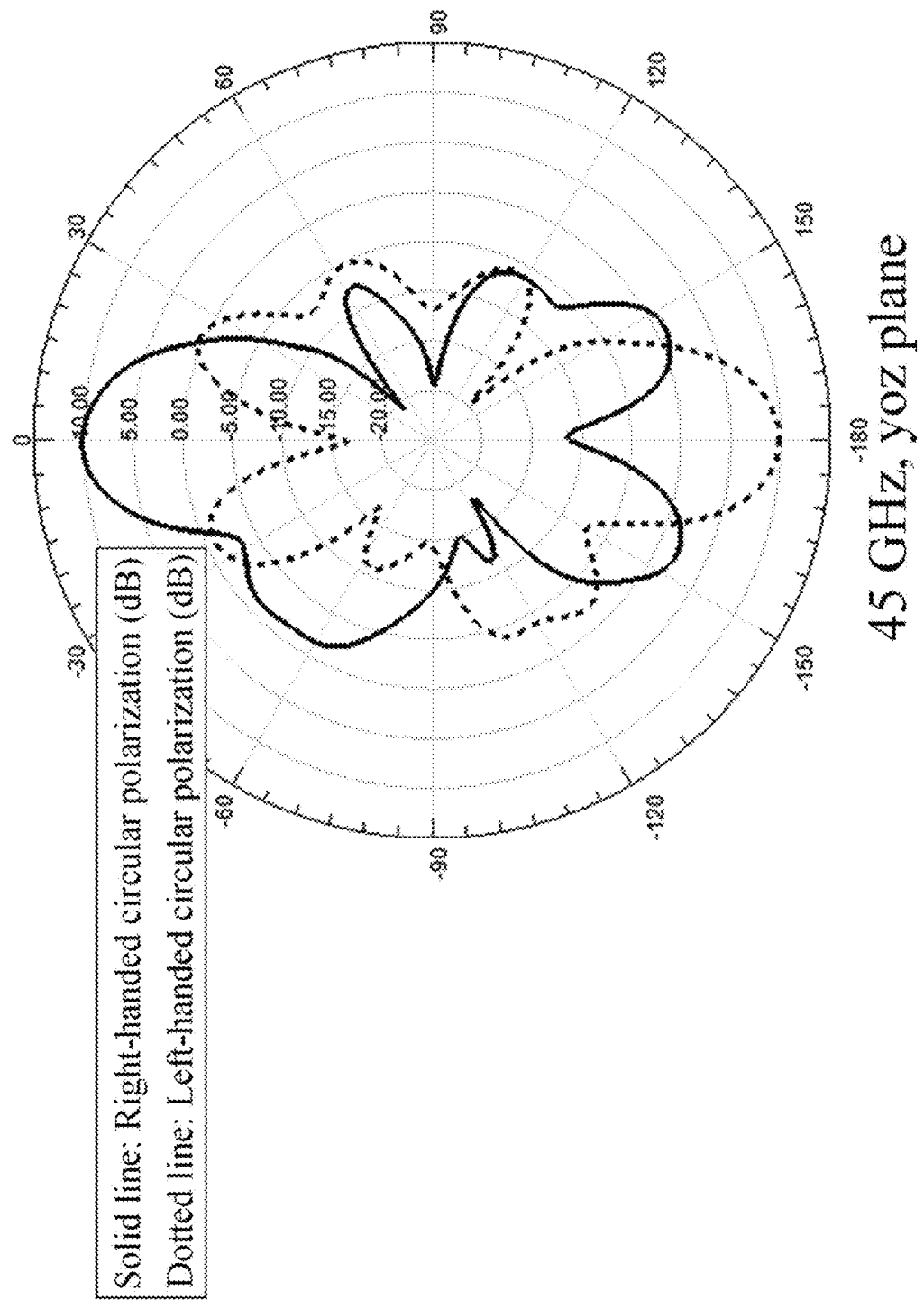
FIG. 15 is a circular polarization pattern of an array antenna of an embodiment 2 of the present disclosure in a yoz plane at a frequency point of 45 GHz.
Figure 16:
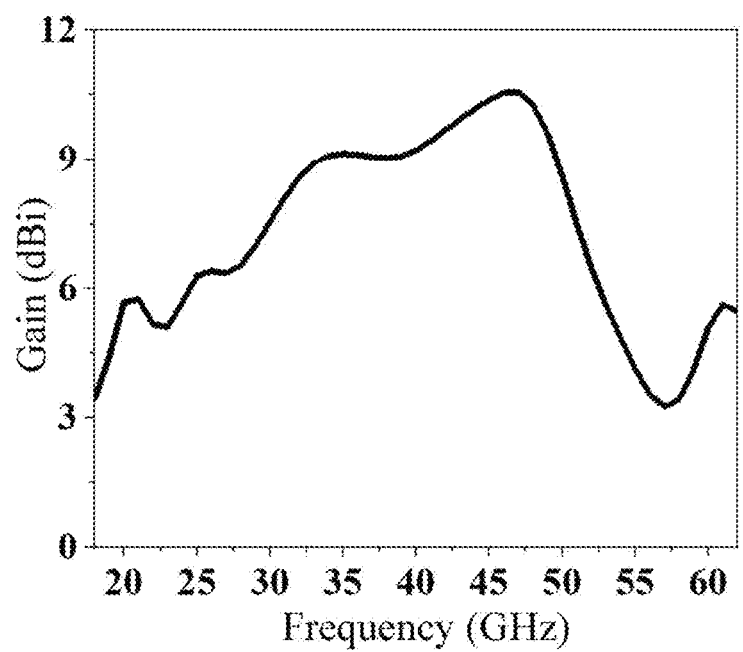
FIG. 16 is a simulation result diagram of gains of an array antenna of an embodiment 2 of the present disclosure.

FIG. 8 is a simulation result of return loss of an array antenna, which shows that the −10 dB return loss bandwidths are 17.6 to 19.7 GHz and 23 to 64.5 GHz. FIG. 9 is a simulation result of an axial ratio of an array antenna, which shows that a 3 dB axial ratio bandwidth is 19.64 to 61.75 GHz and a relative bandwidth is up to 103.5%. FIG. 10 and FIG. 11 are respectively circular polarization patterns of an array antenna in a xoz plane and a yoz plane at a frequency point of 25 GHz, FIG. 12 and FIG. 13 are respectively radiation patterns of an array antenna in a xoz plane and a yoz plane at a frequency point of 35 GHz, and FIG. 14 and FIG. 15 are respectively radiation patterns of an array antenna in a xoz plane and a yoz plane at a frequency point of 45 GHz. The results show that the antenna has good directivity and presents a bidirectional radiation characteristic with right-handed circular polarization radiation in a +z direction and left-handed circular polarization radiation in a −z direction. FIG. 16 is a gain curve of an array antenna in the +z direction.

As shown in the array antenna patterns, obvious bidirectional circular polarization radiation can be observed, and the antenna has good directivity, and has the sidelobe level of greater than 8 dB in the patterns at the three frequency points of 25 GHz, 35 GHz and 45 GHz, indicating that the antenna has good directivity in a broadband range. Moreover, as described in the "Background", the bidirectional radiating array antenna can also be applied in narrow, long and straight fields such as tunnels, such that the use of the antenna is reduced, the signal interference is weakened, and the cost can be reduced.

The program portion of the technology may be thought of as a "product" or "article of manufacture" in the form of executable code and/or associated data that is engaged or implemented by a computer readable medium. Tangible, permanent storage media may include a memory or storage employed by any computer, processor, or similar device or associated modules. For example, various semiconductor memories, tape drives, disk drives or any similar device capable of providing storage functionality for software.

All or parts of the software may sometimes communicate over a network, such as the Internet or other communication network. Such communications may load the software from one computer device or processor to another. For example, loading from a server or host computer of a video target detection device to a hardware platform of a computer environment, or other computer environment implementing the system, or a system with similar functions related to providing the information needed for target detection. Accordingly, another medium capable of delivering software elements may also be used as a physical connection between local devices, such as optical, electrical and electromagnetic waves, for propagation by a cable, a fiber optic cable, or air, or the like. A physical medium used to carry waves, such as a cable, wireless connection or fiber optic cable, may also be considered as medium bearing the software. Unless restricted to tangible "storage" media, other terms expressing computer or machine "readable medium" here refer to the medium that is involved in the execution of any instructions by the processor.

Specific examples are used for illustration of the principles and implementation methods of the present disclosure. The description of the embodiments is merely used to help illustrate the method and its core principles of the present disclosure. It should be understood by those skilled in the art that the modules or steps of the present disclosure described above may be implemented with general purpose computer means. Alternatively, they may be implemented with program code executable by a computing means, such that they may be stored in a storage means for execution by the computing means, or they may be fabricated separately as individual integrated circuit modules, or multiple modules or steps of them may be fabricated as single integrated circuit module for implementation. The present disclosure is not limited to any specific combination of hardware and software.

In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A bidirectional circularly polarized antenna element, comprising:
    a dielectric substrate, and a feeder, a radiation patch, a first plane, a second plane, a first coupling assembly and a second coupling assembly which are embedded in the surface of the dielectric substrate;
    a head end of the radiation patch is flush with a first horizontal edge of the dielectric substrate, a tail end of the feeder is flush with a second horizontal edge of the dielectric substrate, and a tail end of the radiation patch is connected to a head end of the feeder;
    the first plane is located at a left side of the feeder, the second plane is located at a right side of the feeder, the first plane and the second plane are two planes having different heights, and the first plane and the second plane are all grounded;
    gaps are formed among the first plane, the feeder and the second plane; and
    the first coupling assembly is located at a left side of the radiation patch, the second coupling assembly is located at a right side of the radiation patch, and gaps are formed among the first coupling assembly, the radiation patch and the second coupling assembly.

2. The bidirectional circularly polarized antenna element according to claim 1, wherein the first coupling assembly is of a C-type ring structure.

3. The bidirectional circularly polarized antenna element according to claim 1, wherein the second coupling assembly is a section of plane extending from the second plane.

4. The bidirectional circularly polarized antenna element according to claim 1, wherein the head end of the radiation patch is of a half-elliptic structure.

5. The bidirectional circularly polarized antenna element according to claim 1, wherein the dielectric substrate is a PCB.

6. The bidirectional circularly polarized antenna element according to claim 1, wherein the feeder, the radiation patch, the first plane, the second plane, the first coupling assembly and the second coupling assembly are all made of metal materials.

7. A bidirectional circularly polarized array antenna of claim 1, comprising:
    an array dielectric substrate, four bidirectional circularly polarized antenna elements sharing the array dielectric substrate, a rotating feed network for connecting the bidirectional circularly polarized antenna elements, a feed port, and ground planes embedded in the back surface of the array dielectric substrate;
    the rotating feed network comprises a microstrip feeder, a c-type rotating feeder and four feeder stubs; the c-type rotating feeder is connected to the microstrip feeder and the four feeder stubs respectively; the four feeder stubs are respectively connected to the tail ends of the feeders of the four bidirectional circularly polarized antenna elements, every two adjacent bidirectional circularly polarized antenna elements have a phase difference of 90°; the first plane and the second plane of each bidirectional circularly polarized antenna element respectively extend to form a section of plane stub towards the c-type rotating feeder;
    the ground plane comprises a feed port ground plane, a microstrip feeder ground plane, a rotating feeder ground plane, and four stub ground planes respectively corresponding to the feed port, the microstrip feeder, the c-type rotating feeder and the four feeder stubs; the rotating feeder ground plane is respectively connected to the microstrip feeder and the four stub ground planes; the four stub ground planes are connected to two sections of plane stubs of the bidirectional circularly polarized antenna elements in corresponding directions by a plurality of side-by-side metal through vias; the feed port is connected to the feed port ground plane by a plurality of side-by-side metal through vias.

8. The bidirectional circularly polarized array antenna according to claim 7, wherein the first coupling assembly is of a C-type ring structure.

9. The bidirectional circularly polarized array antenna according to claim 7, wherein the second coupling assembly is a section of plane extending from the second plane.

10. The bidirectional circularly polarized array antenna according to claim 7, wherein the head end of the radiation patch is of a half-elliptic structure.

11. The bidirectional circularly polarized array antenna according to claim 7, wherein the dielectric substrate is a PCB.

12. The bidirectional circularly polarized array antenna according to claim 7, wherein the feeder, the radiation patch, the first plane, the second plane, the first coupling assembly and the second coupling assembly are all made of metal materials.

13. The bidirectional circularly polarized array antenna according to claim 7, wherein the first planes and the second planes of every two adjacent bidirectional circularly polarized antenna elements are subjected to corner cut processing.

14. The bidirectional circularly polarized array antenna according to claim 8, wherein the first planes and the second planes of every two adjacent bidirectional circularly polarized antenna elements are subjected to corner cut processing.

15. The bidirectional circularly polarized array antenna according to claim 9, wherein the first planes and the second planes of every two adjacent bidirectional circularly polarized antenna elements are subjected to corner cut processing.

16. The bidirectional circularly polarized array antenna according to claim 10, wherein the first planes and the second planes of every two adjacent bidirectional circularly polarized antenna elements are subjected to corner cut processing.

17. The bidirectional circularly polarized array antenna according to claim 11, wherein the first planes and the second planes of every two adjacent bidirectional circularly polarized antenna elements are subjected to corner cut processing.

18. The bidirectional circularly polarized array antenna according to claim 12, wherein the first planes and the second planes of every two adjacent bidirectional circularly polarized antenna elements are subjected to corner cut processing.

19. The bidirectional circularly polarized array antenna according to claim 7, wherein the microstrip feeder and the microstrip feeder ground plane are both of a layered gradually-changed structure.

20. The bidirectional circularly polarized array antenna according to claim 7, wherein a width of the microstrip feeder is smaller a half wavelength corresponding to the highest frequency of the bidirectional circularly polarized array antenna.

* * * * *